US005353775A

United States Patent [19]

Yamashita et al.

[11] Patent Number: 5,353,775

[45] Date of Patent: Oct. 11, 1994

[54] AIR-FUEL RATIO CONTROL SYSTEM FOR INTERNAL COMBUSTION ENGINE

[75] Inventors: Yukihiro Yamashita, Kariya, Japan; Kenji Ikuta, Rolling Hills Estates, Calif.; Shigenori Isomura, Kariya, Japan

[73] Assignee: Nippondenso Co., Ltd., Kariya, Japan

[21] Appl. No.: 9,199

[22] Filed: Jan. 26, 1993

[30] Foreign Application Priority Data

Jan. 27, 1992 [JP] Japan .................................. 4-012359

[51] Int. Cl.[5] ..................... F02D 41/14; G01N 27/26

[52] U.S. Cl. .................................... 123/686; 123/697

[58] Field of Search ...................... 123/685, 686, 697; 204/406, 425

[56] References Cited

U.S. PATENT DOCUMENTS 4,993,392 2/1991 Tanaka et al. .................. 123/697 X
5,148,795 9/1992 Nagai et al. ......................... 123/697
5,156,044 10/1992 Benninger et al. ................ 73/117.2

FOREIGN PATENT DOCUMENTS 200646 12/1982 Japan .................................. 123/697
61-274249 12/1986 Japan .
232140 9/1989 Japan .................................. 123/697

OTHER PUBLICATIONS

W. A. Whittenberger et al, "Recent Developments in Electrically Heated Metal Monoliths" SAE No. 900503 pp. 61-70, Feb. 1990.

*Primary Examiner*—Tony M. Argenbright
*Attorney, Agent, or Firm*—Cushman, Darby & Cushman

[57] ABSTRACT

An engine temperature is measured an opening of a door is detected so an electrical conduction is made to a heater for heating a sensor element by setting a target element temperature to a relatively high level if such engine temperature (cooling water temperature Thw) is relatively low or, on the other hand, by setting the target element temperature to a relatively low level if the cooling water temperature is relatively high. Then the element temperature is detected and the heater is turned off when the element temperature has reached the target temperature.

8 Claims, 5 Drawing Sheets

AIR-FUEL RATIO CONTROL SYSTEM FOR INTERNAL COMBUSTION ENGINE

BACKGROUND OF THE INVENTION

The present invention relates to an air-fuel ratio control system for an internal combustion engine, which detects the oxygen density in the exhaust gas of, for example, an automobile, to control the air-fuel ratio thereof based on the thus obtained oxygen density.

In recent years, feedback control of the air-fuel ratio immediately after starting an engine has been demanded for the purpose of improving the fuel cost of an internal combustion engine (engine) and for the purpose of promoting cleaning of the exhaust gas. Usually, in such feedback control of the air-fuel ratio, the oxygen density in an exhaust gas is detected by using an oxygen sensor and the mixture ratio of fuel to be supplied to the engine is adjusted on the basis of the detected oxygen density.

Usually, an oxygen sensor used in the above feedback control has an output characteristic which largely depends on temperature and a suitable output may be obtained in a specific temperature range where the sensor element is activated. A heater is thus attached to the body of the sensor to quickly activate the sensor element after starting the engine.

Further, a device (see Japanese Patent Laid-Open Publication No. 61-274249) for use in a system having such a sensor has been proposed, in which power to be initially supplied to the heater of the oxygen sensor when starting the engine is determined on the basis of the temperature of the oxygen sensor at the time of starting.

Since, however, these are all constructed so that an electric conduction to the heater begins at the time of or after starting the engine, they are not satisfactory in achieving a sufficient element temperature for starting the feedback control of the air-fuel ratio at the time when the engine is started. Thus there has been a problem in that a favorable air-fuel ratio control cannot be provided at the time when the engine is started.

In addition, a device (SAE No. 900503) has been proposed, in which preheating is performed before starting the engine. In this art, a seat sensor or the like is attached to the seat of an automobile and the temperature of a catalyst with a heater is elevated to its activation temperature when the seat sensor is turned on upon taking of the seat by a driver. By this method, however, the amount of power to be supplied up to the time of starting becomes large, and, if the battery is of a low voltage or of a small capacity, it is not desirable in that the battery may be exhausted.

SUMMARY OF THE INVENTION

In order to solve the above problems, it is an object of the present invention to provide an air-fuel ratio control system for an internal combustion engine, which reduces power consumption at the power supply and is capable of suitably performing an air-fuel ratio control at the time of starting the internal combustion engine.

In accordance with the present invention, an air-fuel ratio control system for an internal combustion engine is provided, which includes: a Gas density detector unit for detecting an exhaust gas density of the internal combustion engine; and a heater for heating the gas density detector unit to raise the temperature thereof; wherein the air-fuel ratio control is performed on the basis of the exhaust Gas density detected by the gas density detector unit; and which further comprises: engine temperature detection means for detecting an engine temperature of the ambient environment of the Gas density detector unit such as cooling water temperature or intake air temperature of the internal combustion engine; pre-start condition detection means for detecting preparatory operation for driving before the starting of the internal combustion engine; and target temperature setting means which, when the preparatory operation for driving is detected by the pre-start condition detection means, sets a relatively low target temperature of heating by the heater up to the time of starting of the Gas density detector unit if the engine temperature detected by the engine temperature detection means is relatively high and sets a relatively high target temperature if the engine temperature is relatively low.

DESCRIPTION OF THE PREFERRED EMBODIMENT

Figure 1:
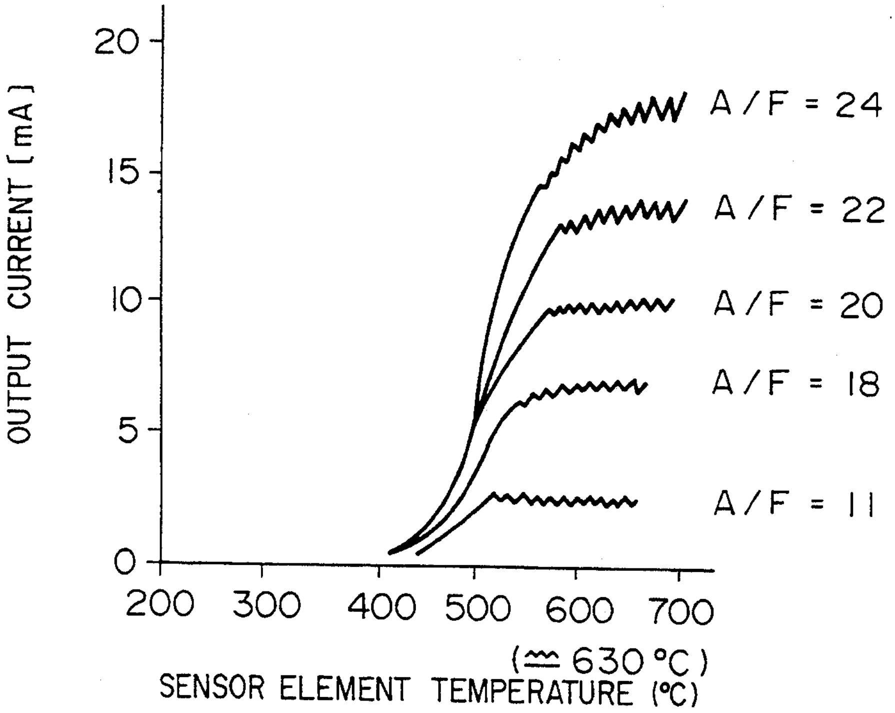
FIG. 1 is a graph for explaining the operation of the present invention.

Conventionally, a gas density detector unit (such as an oxygen sensor) is used in the state where it is heated for example in excess of 630° C. by a heater, since its stable output for each air-fuel ratio (A/F) may be obtained, as shown in FIG. 1, at a certain high temperature range. If, however, it is simply heated by the heater, time for heating the sensor element is necessary at the time of starting and there is also a limit on the ability of a battery or the like to be used as the power supply thereof. The present invention thus has been discovered by noticing the fact that the gradients of temperature rise of the sensor element after its starting differ according to the difference before the starting in an engine temperature such as of cooling water.

Figure 2:
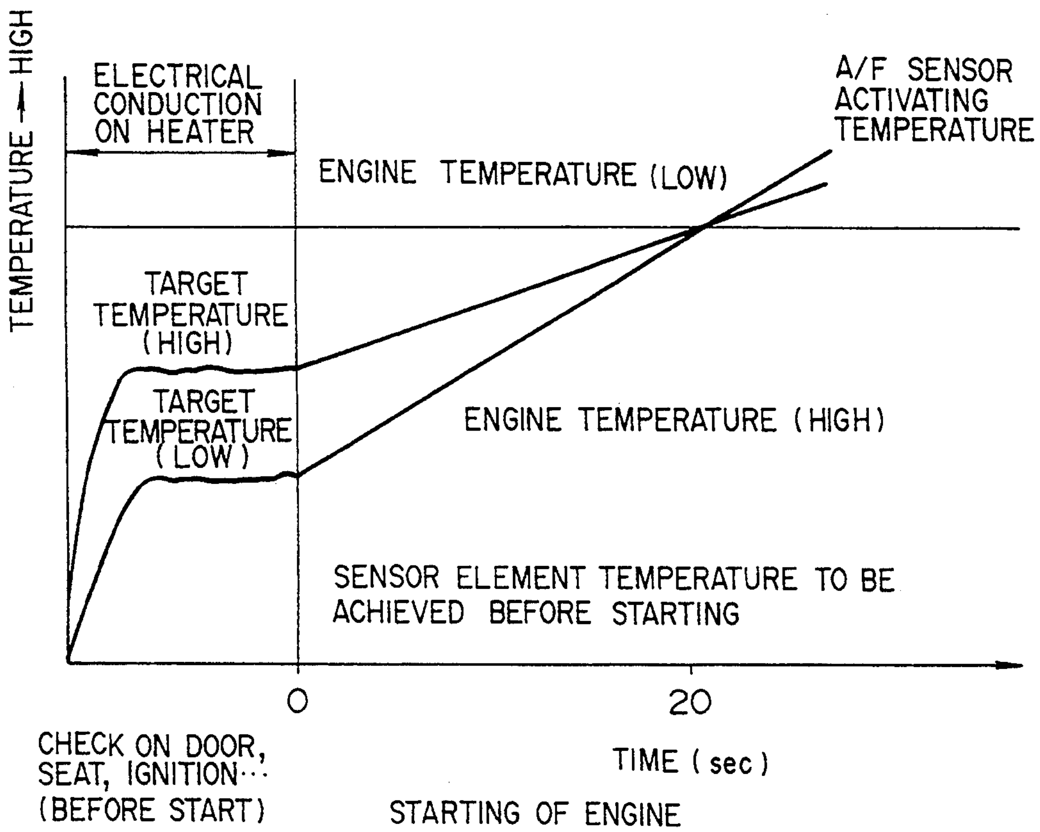
FIG. 2 is a graph showing the output characteristic of an ordinary oxygen sensor.

Specifically, as shown in FIG. 2 by noticing the fact that the rising rate of the element temperature after its starting is relatively low (because the ambient temperature thereof is low) when the engine temperature is relatively low while to the contrary the rising rate of the element temperature after its starting is relatively high when the engine temperature is relatively high, the target element temperature to be attained before the starting is set to a relatively low level when the engine temperature before the starting is higher and it is set to a relatively high level when the same is lower. Thereby, the sensor element temperature may reach the activation temperature of the sensor element in a desired short time period (for example 20 sec) after its starting. In addition, since power supplied before starting may be used correspondingly to the engine temperature without waste, a reduction may be achieved in the power consumption of the power supply.

An embodiment of the air-fuel ratio control system for an internal combustion engine of the present invention will now be described with reference to the drawings. The system of the present embodiment detects the oxygen density in an exhaust gas of an automobile's engine by using an oxygen sensor and renders a control of the fuel mixture based on the thus obtained oxygen density.

Figure 3:
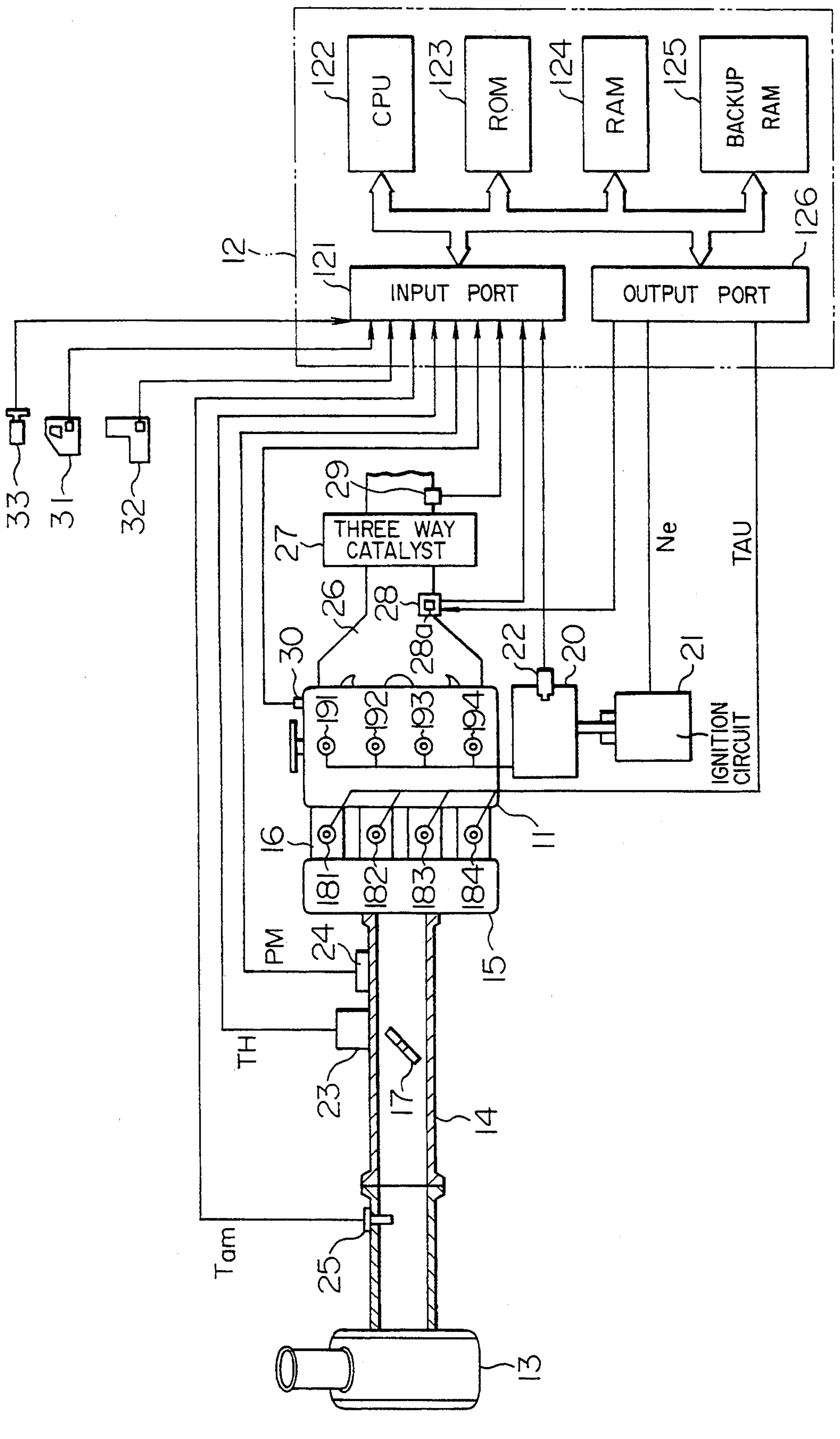
FIG. 3 is a view explanatory of the construction of an engine and the control system of the present invention.

FIG. 3 shows an engine 11 and its peripheral devices which are subjected to an air-fuel ratio control, where a control of devices such as an ignition timing Ig and fuel injection amount TAU of the engine 11 is performed at an electronic control circuit (ECU) 12.

The engine 11 is constructed for example as a spark-ignition four-cycle type having four cylinders, where intake air is taken in through an air cleaner 13, an intake pipe 14, a surge tank 15 and an intake manifold 16. In this case, the amount of intake air is controlled by a throttle valve 17 (driven by an accelerator pedal which is not shown) provided on the intake pipe 14.

Fuel injection valves 181~184 are disposed on the intake manifold 16 corresponding to each cylinder, and pressure-fed fuel from a fuel tank (not shown) is supplied to the fuel injection valves 181~184. The amount of fuel corresponding to a valve opening time of the fuel injection valves 181~184 which are controlled to be open by an instruction from the electronic control circuit 12 is injected into each cylinder of the engine 11.

Further, ignition plugs 191~194 are provided corresponding to the cylinders of the engine 11, and a high voltage ignition signal from an ignition circuit 212 is distributed through a distributor 20 to each of the ignition plugs 191~194.

The distributor 20 has a gear formed for example of a magnetic material rotated by the engine 11, the rotational frequency Ne of the engine 11 being detected by a rotation sensor 22 which is set in close proximity to the outer periphery of the gear. From this rotation sensor 22, twenty-four pulse signals are generated for each two rotations of the engine 11, i.e., 720° CA.

A three way catalyst 27 for reducing toxic components (CO, HC, NOx and others) in the exhaust gas emitted from the engine 11 is positioned on an exhaust pipe 26 of the engine 11. An air-fuel ratio sensor (an oxygen density sensor) 28 for outputting a linear detection signal corresponding to the air-fuel ratio of the fuel mixture supplied to the engine is provided at the upstream side of the three way catalyst 27, while provided downstream thereof is an $O_2$ sensor 29 for outputting a signal corresponding to whether the air-fuel ratio of the fuel mixture supplied to the engine 11 is rich or lean with respect to the theoretical air-fuel ratio $\lambda 0$. Further, a heater 28_a_ for heating the sensor element at the time of its starting is provided on the air-fuel ratio sensor 28.

As is well known, the above electronic control circuit 12 is constructed as an arithmetic and logic circuit of which the main components are a CPU 122, a ROM 123, a RAM 124 and a backup RAM 125, where the operation results based on the information input to an input port 121 are output from an output port 126.

In addition to a detection signal Ne to be input from the rotation sensor 22, the input port 121 of the electronic control circuit 12 receives the respective detection signals from a throttle sensor 23 for detecting the opening rate TH of the throttle valve 17, an intake pressure sensor 24 for detecting an intake pressure PM at the downstream side of the throttle valve 17; an intake temperature sensor 25 for detecting an intake temperature Tam; and a water temperature sensor 30 for detecting the cooling water temperature Thw of the engine 11.

Furthermore, the detection signals from the air-fuel ratio sensor 28 and the $O_2$ sensor 29 and signals from a door sensor 31, seat sensor 32 and ignition switch 33 are also input to the input port 121.

A suitable fuel injection amount TAU and an ignition timing Ig are calculated at the electronic control circuit 12 on the basis of the intake pressure PM, the intake temperature Tam, the throttle opening rate TH, the cooling water temperature Thw, the air-fuel ratio A/F as well as the rotation number Ne, which are all input to the ECU 12 from the respective sensors through the input port 121. The valve-opening time of the fuel injection valves 181~184 is controlled on the basis of the fuel injection amount TAU and the ignition circuit 21 is controlled by the calculated ignition timing Ig.

Furthermore, on the basis of the signals from the door sensor 31, the seat sensor 32 and the ignition switch 33, a judgment is made as to whether or not the system is in the pre-start condition (that is the state before the ignition switch is turned on). If it is judged as being in the pre-start condition the target element temperature is set on the basis of the engine temperature in a manner which will be described later in detail and electrical conduction to the heater 28_a_ is effected. Furthermore, it is constructed so that the engine 11 cannot be started unless the set temperature is achieved.

Figure 4:
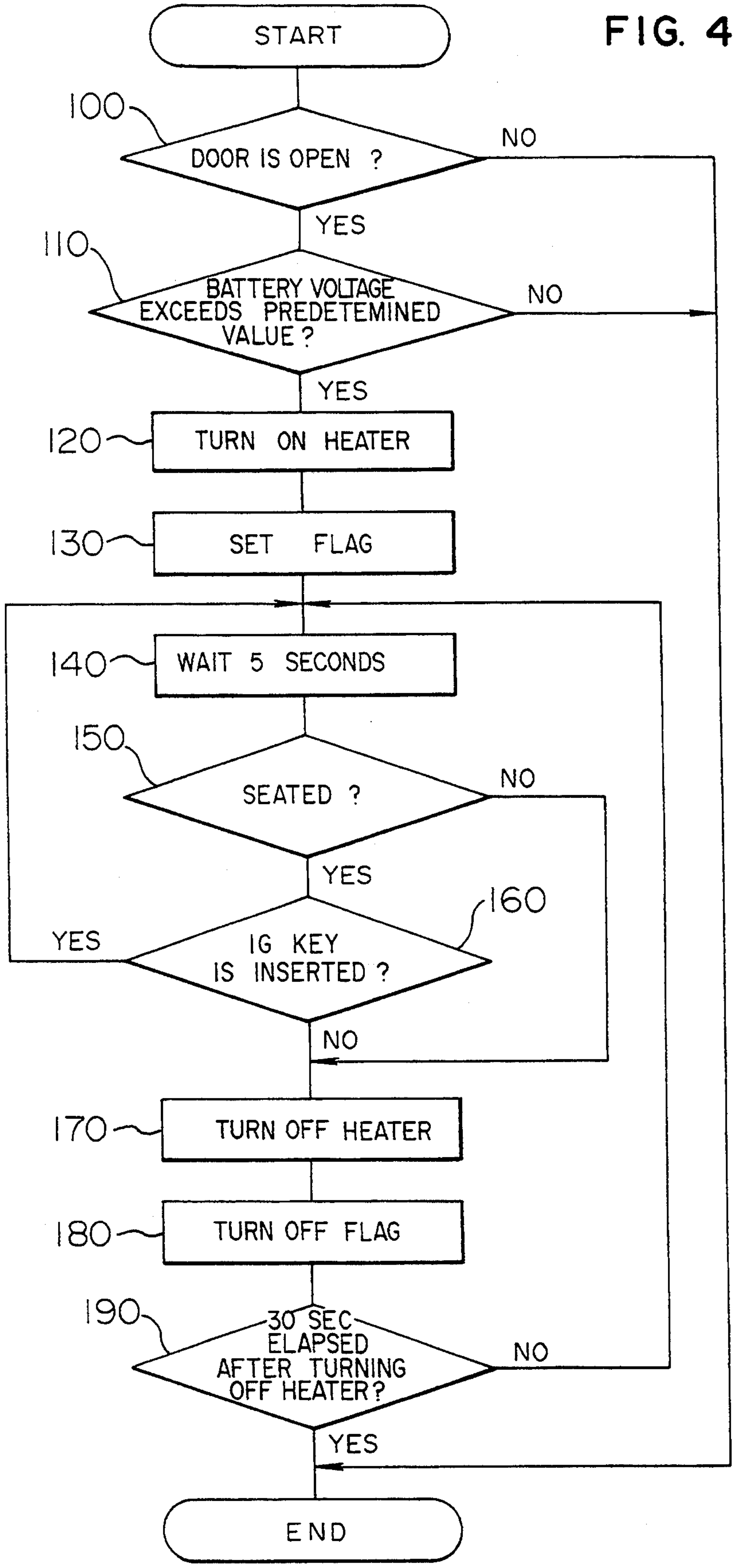
FIG. 4 is a flowchart showing the process of the ON/OFF control of the heater.
Figure 5:
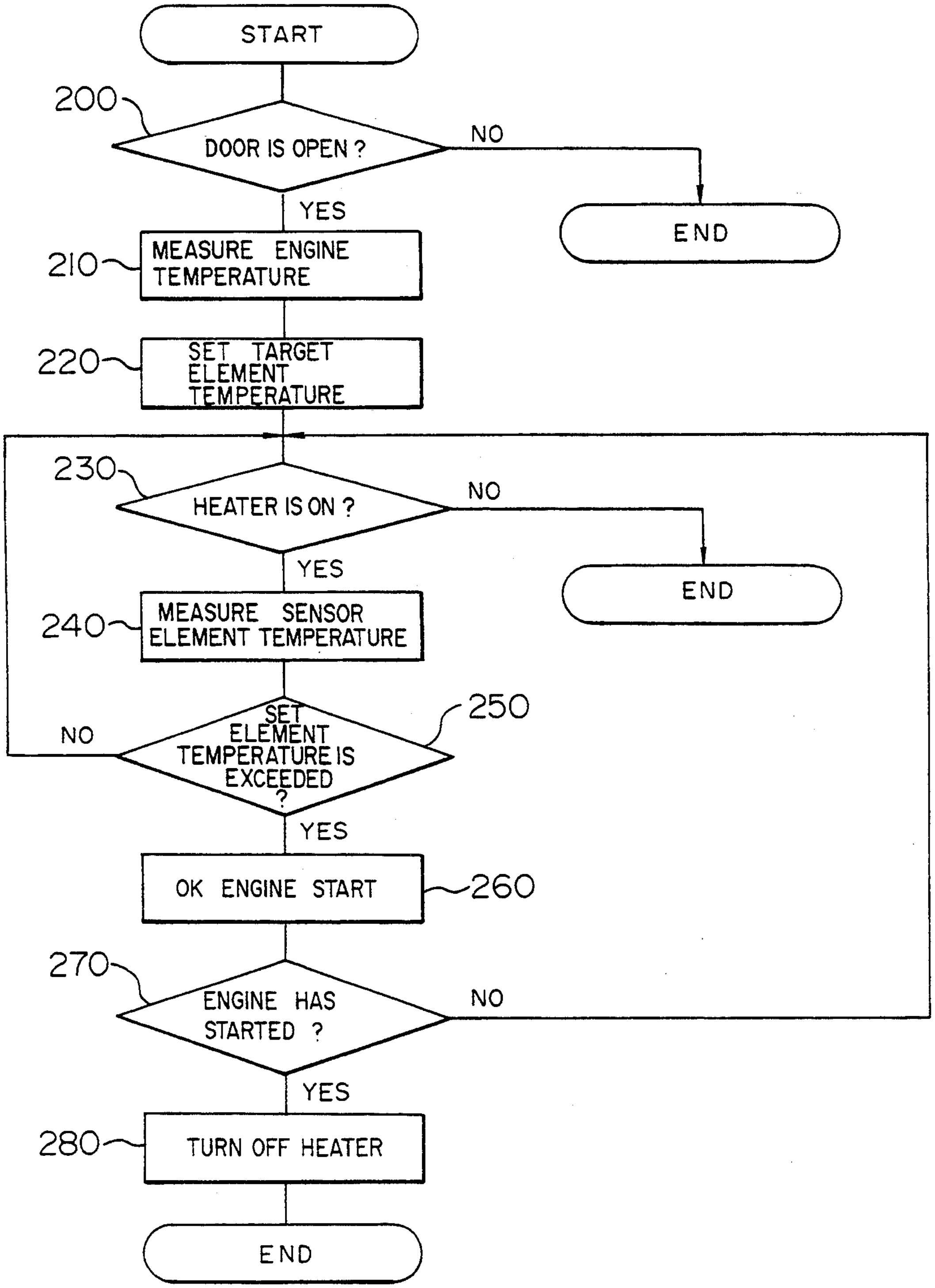
FIG. 5 is a flowchart showing the process for setting the element temperature of an oxygen sensor.

In the following, the operation of the air-fuel ratio control system of the present invention constructed in the manner as described will be described by way of the flow-charts in FIGS. 4 and 5.

First, the ON/OFF control of the heater 28_a_ will be described based on FIG. 4.

As shown in the figure, at step 100 (hereinafter "step" is set down as "S"), a judgment is made on the basis of the output of the door sensor 31 as to whether the door is opened. Here, if an affirmative judgment is made, processing proceeds to S110, while, in the case of a negative judgment, the present processing is terminated.

It is judged at S110 whether or not the battery voltage exceeds a predetermined level. Here, processing proceeds to S120 if it is judged that the battery voltage exceeds the predetermined level which is sufficient for making electrical conduction to the heater 28_a_, while the present processing is terminated if a negative judgment is made indicating that the battery voltage is at a low level.

While the electric conduction to the heater 28_a_ begins at S120, the electrical conduction to the heater 28_a_ means starting of a duty ratio control which controls the amount of power consumption by the heater 28_a_ by periodically turning ON/OFF the electrical conduction.

At the subsequent S130, flag HF for indicating the start of duty ratio control is on and at the next S140 the system waits for 5 seconds for the purpose of both heating the air-fuel ratio sensor 28 ahead and for securing time for the seat to be taken, and then processing proceeds to S150.

At S150, whether or not the driver is taking the seat is judged by the seat sensor 32. Here, processing proceeds to S160 if it is Judged that the seat is taken while, if a negative judgment is made, processing proceeds to S170.

At S160, a judgment is made as to whether or not the ignition (IG) key is inserted into the ignition switch 33. Here, if an affirmative judgment is made, processing returns to S140 where electrical conduction to the heater 28*a* and processing for confirming that the operation immediately before the start of driving are performed, while on the other hand processing proceeds to the S170 if a negative Judgment is made.

At step 170 to which processing has proceeded due to a negative judgment made at the above S150 or S160, i.e., as a result of judgment that the system is not in the condition immediately before the start of the engine 11, processing for turning off the heater 28*a* is performed to protect the battery. At the subsequent S180, the flag HF for indicating the electrically conducted state of the heater 28*a* is turned off to indicate that the heater 28*a* is off.

At the subsequent S190, a judgment is made as to whether or not 30 seconds has elapsed since turning off of the heater 28*a*. Here, if 30 seconds have not elapsed, processing returns to S140 where processing similar to the above is repeated, while the present processing is terminated if 30 seconds have elapsed.

A description will now be given based on FIG. 5 with respect to the process for setting the element temperature of the air-fuel ratio sensor 28 which is performed by using an ON/OFF processing of the heater 28*a* as shown in the above FIG. 4.

First, at S200, a Judgment is made as to whether or not the door is open. Here, processing proceeds to S210 if an affirmative judgment is made while on the other hand the present processing terminated if a negative judgment is made.

At S210, the cooling water temperature Thw of the engine 11 is measured on the basis of a signal from the water temperature sensor At the subsequent S220, a map consisting of the cooling water temperature Thw and the target element temperature stored at ROM 124 is looked up to set a target element temperature corresponding to the measure cooling water temperature Thw. That is, processing is performed, in which, as shown in FIG. 2, the target element temperature is set to a relatively high level when the cooling water temperature Thw regarded as the engine temperature is relatively low because the rising rate of the element temperature thereof after starting is smaller, while, when the cooling water temperature Thw is relatively high, the target element temperature is set to a relatively low level because the rising rate of the element temperature thereof after starting is higher.

At the subsequent S230, whether or not electrical conduction to the heater 28*a* has been started, is judged on the basis of presence/absence of the flag HF. Here, processing proceeds to S240 if an affirmative judgment is made that the heater 28*a* is on, while on the other hand the present processing is terminated if a negative judgment is made.

At S240, the sensor element temperature is measured for example using a thermistor or the like (not shown) positioned in close proximity to the sensor element, and processing proceeds to S250.

At S250, a judgment is made as to whether the measured element temperature exceeds the target element temperature set at the above S220. Here processing proceeds to S260 if an affirmative judgement is made while on the other hand processing returns to S230 to continue the electrical conduction to the heater 28*a* if a negative judgment is made.

At S260, the process for allowing the start of the engine 11 is performed. It should be noted that, the fact that the engine 11 is in a state capable of being started may be signified by turning on a lamp for example by a diagnosis and releasing the lock on the ignition key.

At the subsequent S270, a judgment is made as to whether the engine 11 has been started. Here, processing proceeds to S280 if an affirmative judgment is made while on the other hand processing returns to S230 if a negative judgment is made. At S280, the process for turning off the electrical conduction to the heater 28*a* is performed and the present processing is terminated.

As described above, in the present embodiment, the preparatory state for driving such as an opening of the door before starting of the engine 11 is detected. Then, on the basis of the measured cooling water temperature Thw of the engine 11, the target element temperature is set to a relatively high level if the cooling water temperature Thw is relatively low while on the other hand the target element temperature is set to a relatively low level if the cooling water temperature Thw is relatively high. Thereby an excessive power consumption before its starting is avoided. In addition, the attainment of a sufficient element temperature for activating the air-fuel ratio sensor 28 may be achieved at the time of starting an actual operation so that a reduction of emission is possible by an early feedback control.

It is to be understood that the present invention is not limited to the above embodiment and various modifications thereof are naturally possible without departing from the scope and spirit of the present invention.

As has been described, when the preparatory operation for driving is detected by the pre-start condition detection means, the air-fuel ratio control system for an internal combustion engine according to the present invention sets the target temperature of heating for a heater prior to starting of the gas density detector unit to a relatively low level when the engine temperature detected by the engine temperature detection means is relatively high, while it sets the target temperature to a relatively high level when the engine temperature is relatively low. There are conspicuous advantages in that an excessive power consumption such as of a battery before starting may be avoided and in addition that a sufficient element temperature at which the gas density detector unit is activated may be attained at the time of starting actual operation so that a reduction of emission is possible by an early feedback control.

What is claimed is:

1. An air-fuel ratio control system for an internal combustion engine, comprising:

- a gas density detector unit for detecting an exhaust gas density of said internal combustion engine;
- a heater for heating said gas density detector unit to raise a temperature thereof;
- engine temperature detection means for detecting an engine temperature of an ambient environment of said gas density detector unit;
- pre-start condition detection means for detecting a preparatory operation for driving before starting said internal combustion engine; and
- target temperature setting means for, upon detection of said preparatory operation for driving by said pre-start condition detection means, setting a target temperature for heating by said heater to a relatively low level if said engine temperature detected by said engine temperature detection means is relatively high and for setting said target temperature to a relatively high level if said engine temperature is relatively low.

2. An air-fuel ratio control system for an internal combustion engine according to claim 1, wherein said target temperature set by said target temperature setting means is a temperature lower than an activation temperature of said gas density detector unit.

3. An air-fuel ratio control system for an internal combustion engine according to claim 1, wherein said pre-start condition detection means detects at least one of opening of a door, taking of a seat, and insertion of an ignition key.

4. An air-fuel ratio control system for an internal combustion engine according to claim 1, wherein said gas density detector unit includes an air-fuel ratio sensor provided on an exhaust pipe of said internal combustion engine for outputting a detection signal corresponding to air-fuel ratio of a fuel mixture supplied to the internal combustion engine; and said system further comprises:

an $O_2$ sensor provided at a downstream side of the air-fuel ratio sensor for outputting a signal corresponding to whether said air-fuel ratio corresponding to a fuel mixture supplied to said internal combustion engine is rich or lean with respect to a theoretical air-fuel ratio;

said air-fuel ratio sensor having said heater provided thereon.

5. An air-fuel ratio control system for an internal combustion engine, comprising:

a gas density detector unit for detecting an exhaust gas density of said internal combustion engine;

a heater for heating said gas density detector unit to raise a temperature thereof;

a water temperature sensor to detect a temperature of said internal combustion engine;

a pre-start condition sensor unit to detect a preparatory operation for driving before starting said internal combustion engine; and an electronic control unit connected to said pre-start condition sensor unit and to said heater, said electronic control unit setting a target temperature for heating by said heater to a relatively low level if said engine temperature detected by said water temperature sensor is relatively high and for setting said target temperature to a relatively high level if said engine temperature is relatively low.

6. An air-fuel ratio control system for an internal combustion engine according to claim 5, wherein said target temperature set by said electronic control unit is a temperature lower than an activation temperature of said gas density detector unit.

7. An air-fuel ratio control system for an internal combustion engine according to claim 5, wherein said pre-start condition sensor unit detects at least one of opening of a door, taking of a seat, and insertion of an ignition key.

8. An air-fuel ratio control system for an internal combustion engine according to claim 5, wherein said gas density detector unit includes an air-fuel ratio sensor provided on an exhaust pipe of said internal combustion engine for outputting a detection signal corresponding to air-fuel ratio of a fuel mixture supplied to the internal combustion engine; and said system further comprises:

an $O_2$ sensor provided at a downstream side of the air-fuel ratio sensor for outputting a signal corresponding to whether said air-fuel ratio corresponding to a fuel mixture supplied to said internal combustion engine is rich or lean with respect to a theoretical air-fuel ratio;

said air-fuel ratio sensor having said heater provided thereon.

* * * * *